United States Patent
Promutico et al.

(10) Patent No.: US 11,459,793 B2
(45) Date of Patent: Oct. 4, 2022

(54) METHOD FOR CONTROLLING THE OPERATION OF A DOOR-LOCK DEVICE AND CONTROL SYSTEM THEREOF

(71) Applicant: BITRON S.P.A., Turin (IT)

(72) Inventors: Fabrizio Promutico, Turin (IT); Enrico Adiutori, Turin (IT); Antonino Sidari, Turin (IT)

(73) Assignee: BITRON S.P.A., Turin (IT)

( * ) Notice: Subject to any disclaimer, the term of this patent is extended or adjusted under 35 U.S.C. 154(b) by 769 days.

(21) Appl. No.: 16/448,433

(22) Filed: Jun. 21, 2019

(65) Prior Publication Data
US 2019/0390393 A1    Dec. 26, 2019

(30) Foreign Application Priority Data

Jun. 22, 2018  (IT) .......................... 102018000006543

(51) Int. Cl.
| | |
|---|---|
| *D06F 34/20* | (2020.01) |
| *E05B 17/22* | (2006.01) |
| *G05B 9/02* | (2006.01) |
| *A47L 15/00* | (2006.01) |
| *D06F 37/28* | (2006.01) |
| *D06F 39/14* | (2006.01) |

(Continued)

(52) U.S. Cl.
CPC .......... *E05B 17/22* (2013.01); *A47L 15/0049* (2013.01); *D06F 34/20* (2020.02); *D06F 37/28* (2013.01); *D06F 39/14* (2013.01); *G05B 9/02* (2013.01); *G07C 9/00174* (2013.01); *G07C 9/00571* (2013.01); *D06F 37/42* (2013.01); *D06F 2103/40* (2020.02); *D06F 2103/44* (2020.02); *E05B 2047/0067* (2013.01); *E05B 2047/0072* (2013.01); *G07C 2009/00634* (2013.01)

(58) Field of Classification Search
CPC ....................................................... D06F 34/20
See application file for complete search history.

(56) References Cited

U.S. PATENT DOCUMENTS

2010/0192994 A1    8/2010    Christmann et al.

FOREIGN PATENT DOCUMENTS

| DE | 102014204606 A1 | 9/2015 |
|---|---|---|
| KR | 20170011129 A | 2/2017 |

(Continued)

OTHER PUBLICATIONS

Italian Search Report dated Mar. 6, 2019 from Italian Application No. 102018000006543.

*Primary Examiner* — Jason Y Ko
(74) *Attorney, Agent, or Firm* — Innovation Capital Law Group, LLP; Vic Lin

(57) ABSTRACT

The present disclosure concerns a method for detecting the status and failure of a door-lock device of a household appliance door, having two terminals and operating through different states. The method comprises the steps of applying a first control signal with a polarization, detecting the impedance at the terminals, and applying a second control signal, having opposite polarization to the first control signal, detecting the impedance to the ends of the terminals. In a reference table, the impedances at the ends of the terminals for each of the door-lock device states are provided. The method also compares the impedance values measured at the ends of said terminals with those of the comparative table, so as to detect the states of the door-lock device and any faults of the door-lock device according to the detected impedance values.

13 Claims, 3 Drawing Sheets

(51) Int. Cl.
*G07C 9/00* (2020.01)
*D06F 37/42* (2006.01)
*E05B 47/00* (2006.01)
*D06F 103/40* (2020.01)
*D06F 103/44* (2020.01)

(56) References Cited

FOREIGN PATENT DOCUMENTS

| | | |
|---|---|---|
| WO | 2014113211 A1 | 7/2014 |
| WO | 2015114597 A1 | 8/2015 |

METHOD FOR CONTROLLING THE OPERATION OF A DOOR-LOCK DEVICE AND CONTROL SYSTEM THEREOF

BACKGROUND OF THE INVENTION

The present invention relates to a method for controlling the operation of a door-lock device and control system thereof.

More specifically, the invention relates to a method for controlling the operation of a door-lock, in particular an electronic door-lock device having two terminals, of the type applied to household appliances, such as washing machines, dishwashers and the like, designed and manufactured in particular for detecting any faults.

The operating principle of the method object of the present invention can be used for any circuit, preferably two-terminal type circuit, of which it is necessary to constantly detect the correct operation in different operating states.

In the following, the description will be directed to the detection of the correct operation of a door-lock device intended to be installed on a household appliance, but it is clear that it should not be considered limited to this specific use.

As is well known, there are currently devices known as door-lock devices, suitable for detecting when the door of a household appliance, such as a washing machine, for example, is closed and subsequently for locking it closed, to allow the washing machine to safely activate the washing program.

Currently there are several door-lock devices that can lock a closed a door, after it is closed.

By way of example, international patent application WO2015/114597 discloses a door-lock device capable of detecting when the door of a household appliance is closed and/or locked and of driving its locking and unlocking.

However, these door-lock devices according to the prior art do not provide systems or criteria capable of detecting when the same do not correctly operate due to faults, occurring to the components, which they are made of. It is even less possible according to the prior art detecting the reasons for the possible fault.

SUMMARY OF THE INVENTION

In light of the above, it is therefore an object of the present invention proposing an easy implemented method, whereby a properly programmed central control unit of a household appliance can detect the correct operation of an electronic circuit of a door-lock device before and during the locking of a household appliance door.

It is also an object of the present invention proposing a control method which can detect the cause of the possible fault.

It is therefore specific object of the present invention a method for detecting the status and failure of a door-lock device of a household appliance door, wherein said door-lock device is of the type having electrical or electronic components and a first and a second terminal for power supplying, wherein said door-lock device has different door-lock states, wherein said method comprises the following steps: A. applying a first control signal having a first polarization; B. detecting the impedance to the ends of said first and second terminals due to the application of said first control signal; C. applying a second control signal, having opposite polarization to said first control signal; D. detecting the impedance to the ends of said first and second terminals following the application of said second control signal; E. providing a reference table, wherein the impedances at the ends of said first and second terminal of said door-lock device in each of said door-lock device states are provided; and F. comparing the impedance values measured at the ends of said first and second terminals with those of said comparative table, so as to detect the states of the door-lock device and therefore any faults of said door-lock device, according to the detected impedance values.

Always according to the invention, the door-lock states may comprise: opened door of said household appliance; unlocked closed door of said household appliance; and locked door of said household appliance; wherein each of said states can undergo as many variations as there are ways of failure of the door-lock device.

Still according to the invention, said steps A-F may be cyclically repeated.

Advantageously according to the invention, said first control signal may have a quadratic waveform, and/or said second control signal may have a quadratic waveform.

Further according to the invention, said door-lock device may be supplied by a supply voltage and said control signals may have a control voltage lower than said supply voltage.

Preferably according to the invention, each pair of said first and second control signals may be transmitted at predefined time intervals.

Always according to the invention, said predefined time intervals may be equal to 30 seconds.

It is further object of the present invention a control system comprising a door-lock device and a central control unit, connected to said first and second terminals of said door-lock device, wherein said central control unit is configured to carry out the steps of the method according to any one of the preceding claims.

Always according to the invention, said door-lock device may comprise a first and a second electrical terminal, connectable to said central control unit, a closing switch series arranged to said first or second terminal, at least one coil connected to said first and said second terminal, and a Hall sensor connected to said first and said second terminal, arranged in parallel with said at least one coil.

Still according to the invention, said door-lock device may comprise a first and a second coil, series connected.

Further according to the invention, said door-lock device may comprise a first and a second electrical terminal, connectable to said central control unit, a closing switch arranged in series with said first or second terminal, a coil connected to said first and said second terminal, a switch controlled by said coil and a diode, series connected to said switch, wherein said diode and said switch are parallel connected to said coil, and a resistor series connected to said coil and to the branch, wherein said switch and said diode are series connected.

It is also object of the present invention a program for the central control unit comprising instructions, which, when said program is executed by a central control unit, cause said central control unit to carry out the steps of said method as defined above.

It is further object of the present invention a storage medium readable from a central control unit, comprising instructions, which, when executed by a central control unit, cause the central control unit to carry out the steps of said method as defined above.

BRIEF DESCRIPTION OF THE DRAWINGS

The present invention will be now described, for illustrative but not limitative purposes, according to its preferred embodiments, with particular reference to the figures of the enclosed drawings, wherein.

In the various figures, similar parts will be indicated by the same reference numbers.

DETAILED DESCRIPTION OF THE PREFERRED EMBODIMENTS

Figure 1:
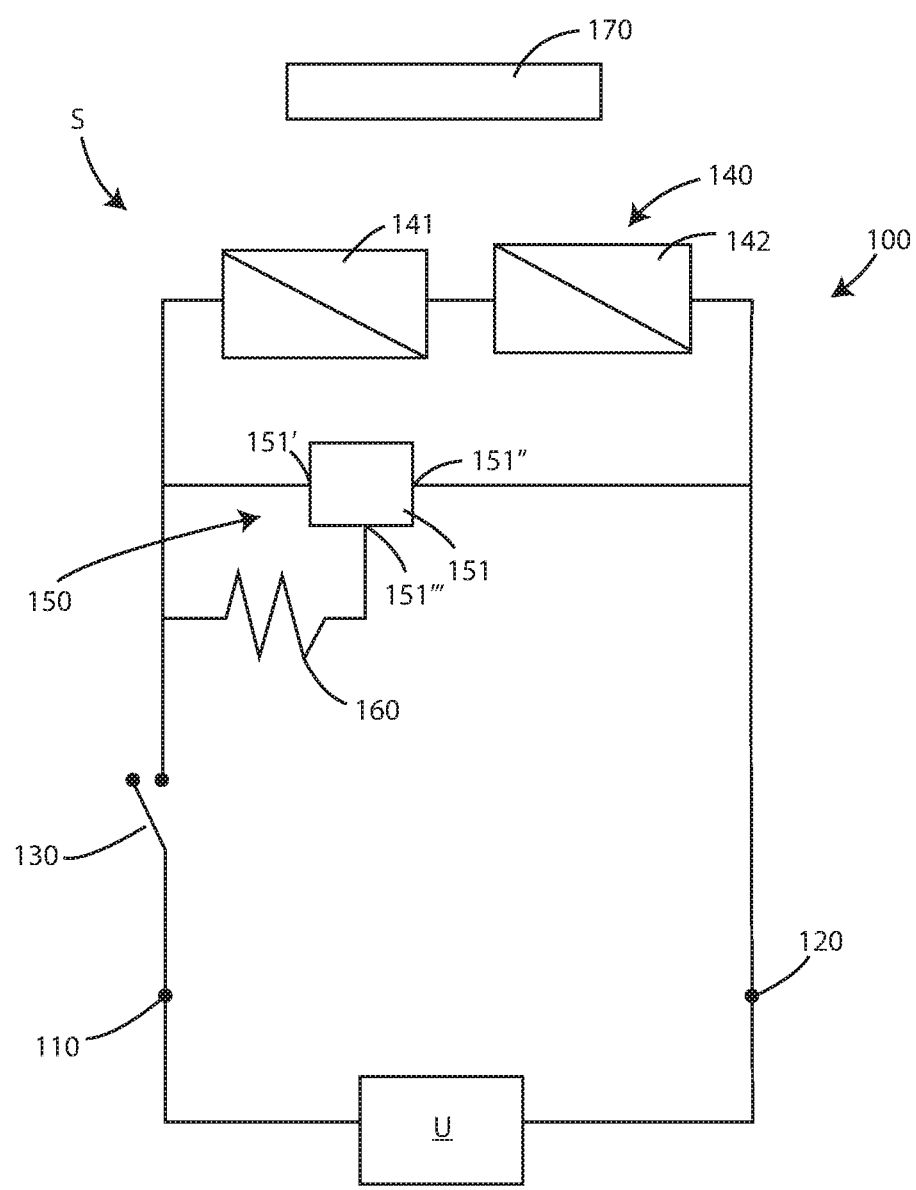
FIG. 1 shows the electrical diagram of a first embodiment of a control system of a door-lock device that carries out the controlling method according to the present invention.

With reference to FIG. 1, a control system S of a two-terminal door-lock device 100 can be observed, for locking a door of a household appliance (not shown in the Figures), such as a washing machine, a dishwasher and the like.

Said household appliance is equipped with a central control unit U, which is generally configured to perform a working program, for example a cloth washing program, in case of a washing machine, or a dishwashing program, in case of a dishwasher. Said central control unit U is also configured to control the change of state of the door lock in normal conditions (not failure) and of the relevant door, on which it is installed, or from unlocked closed door to locked door.

Said central control unit U is also configured to perform the control method U according to the present invention, which will be better defined in the following.

The door lock device 100 comprises a first 110 and a second connecting terminal 120, which can be connected to said logic control unit U of said household appliance, and a closing switch 130, series connected with said first terminal 110 (but equivalently it may be connected in series with said second terminal 120) and arranged so as to close when the door of the household appliance is closed (not shown in the figure).

In particular, when the door of the household appliance is open, the closing switch 130 remains open, preventing said logic control unit from supplying said door-lock device 100.

The door lock-device 100 also comprises an actuator 140, which in the present case comprises a first 141 and a second 142 coil, connected together in series and between said first 110 and second 120 terminal.

Moreover, said door-lock device 100 also comprises detection means 150, comprising a Hall sensor 151, having three terminals 151', 151" and 151''', two of which, namely the terminals 151' and 151", are connected to said first terminal 110 and second terminal 120, while the third terminal 151''' is connected, by means of a bias resistor 160, to said first terminal 110.

Said Hall sensor 151, when properly polarized, or when a suitable polarization is applied to said first terminal 151' and second terminal 151", is capable of detecting the surrounding magnetic field and its variations, varying its impedance at the ends of said first 151' and second 151" terminal.

Instead, if said Hall sensor 151 is supplied with an opposite polarization, said Hall sensor 151 behaves like an open circuit.

The door-lock device 1 also comprises an actuating assembly 170, operatively connected to said actuator 140, and in particular, in the present embodiment, to said first 141 and second coils 142.

Said actuating assembly 170, shown only schematically in the Figure, is capable of effectively (mechanically) locking or unlocking the door of the household appliance, on which the door-lock device 100 is installed.

In particular, in the present embodiment, to be operatively connected to said first 141 and second 142 coils, said actuating assembly 170 is preferably made of magnetically permeable material.

In general, said actuating assembly 170 is capable of assuming an unlocking position, in which, when the door of the household appliance is closed but is not held locked, the door can be opened again; and a locking position, in which, when the door of the household appliance is closed, it is also locked closed, to prevent it to be opened.

As will be better explained below, said actuating assembly 170 is capable of passing from said unlocking position to said locking position, as a result of the magnetic field generated by said first 141 and second 142 coils.

Said actuating assembly 170 can be made in different distinct ways.

The operation of the control system S and of the relative door-lock device 100 described above is as follows.

When the door of the household appliance is open, the closing switch 130 is also open. As a result, the door-lock device circuit 1 cannot be powered.

When the door is closed, the closing switch 130 is also closed. Therefore, the central control unit U of the household appliance can supply the door-lock device 1.

To lock the door, the central control unit U powers the door-lock device 100 with a direct current DC supply voltage, having a first polarity of said door-lock device 1. Generally, this power supply is set at 12 Volts.

The first polarity of said supply voltage is such as to bias the Hall sensor 151, activating it.

In this way, the supply current I passes through said first 41 and second 42 coils, which generate a predefined magnetic field, which interacts with said actuating assembly 170, causing it to pass from said unlocking position to said locking position.

Accordingly, the Hall sensor 151 detects a change in the magnetic field due to the displacement of the actuating assembly 170, which modifies, thanks to its magnetic permeability, the magnetic field surrounding said Hall sensor 151.

The Hall sensor 151 therefore varies the impedance at the ends of its terminals 151' and 151", and, consequently, the detected impedance of the door-lock device 100 at the ends of the terminals 110 and 120.

The central control unit U is capable of detecting the impedance at the ends of said first 110 and second 120 terminals. Therefore, said central control unit U thus obtains the indication that the door, in addition to be closed, is also locked.

When it is necessary to unlock the door, the central control unit U changes the polarity of the supply at the ends of said first 110 and second 120 terminal of said door-lock device 100.

In this case, the magnetic field generated by said first 141 and second coils 142 varies in such a way as to cause said actuating assembly 170 to pass from said locking position to said unlocking position.

The Hall sensor 151 is now inversely polarized, increasing its impedance ideally to infinite, creating a sort of open circuit at the ends of the terminals 151' and 151".

In a variant of said first embodiment of said control system S, the actuator 140 may comprise a single coil 141.

As can be seen, according to the state and the polarization of the power supply of the door-lock device 100, provided by the central control unit U, the impedance at the ends of said first 110 and second 120 terminal varies.

The control method according to the present invention provides for the transmission of test signals having a suitable polarity and sequence, detecting the impedance at the ends of said first 110 and second 120 terminal of said door-lock device 100, determining the states of the door-lock device (open door, locked closed door and unlocked closed door) and any faults of said door-lock device 100 based on the detected impedance. Basically, the states of the door-lock device are defined as those normal or anomalous conditions, in which the door-lock device can be in the conditions of an open, locked closed door and unlocked closed door.

Figure 2:
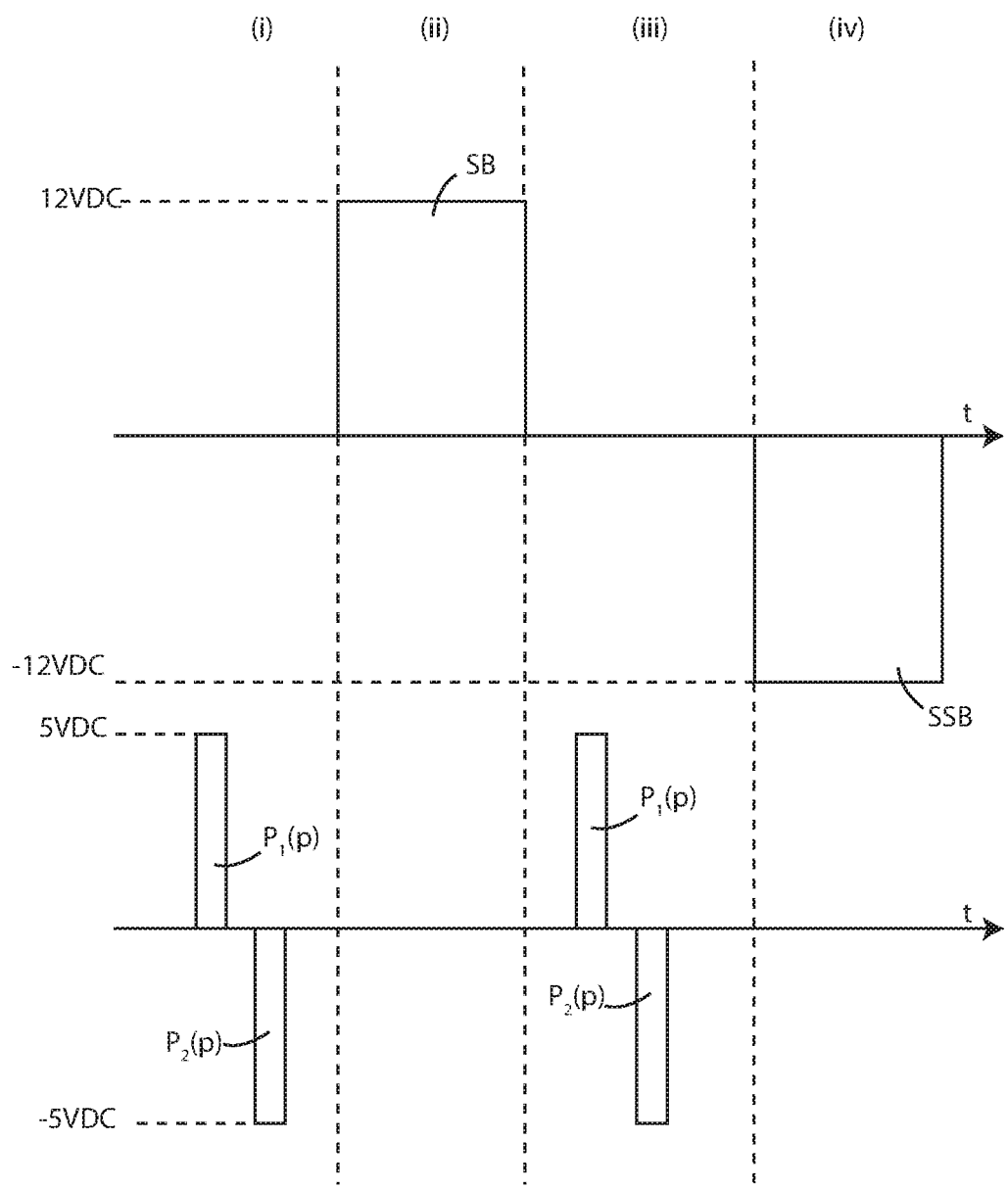
FIG. 2 shows time diagrams of the signals for detecting the operation and the control of a door-lock device.

Referring in particular to FIG. 2, wherein in the upper quadrant the power supply of the door-lock device 100 through said first terminal 110 and second terminal 120 is shown, supplied and controlled by said central control unit U. This supply voltage is set in the present embodiment at a voltage value of 12 Volts. This voltage has a value such as to activate said actuator 140.

Control signals are shown in the lower quadrant, defining a control voltage and having a peak voltage lower than the supply voltage so as not to activate said actuator 140 and, moreover, also with a time amplitude suitable for not activating said actuator 140. In the case at issue, this control voltage is equal to 5 Volts.

Power supply voltage and control voltage generally have different maximum values, as mentioned, but could also be the same, if the duration of the control signals is not such as to allow the actuator activation.

The control method according to the invention is developed in the four machine steps indicated in FIG. 2 with (i), (ii), (iii) and (iv).

In the first step (i), takes place the detection of the door closure and a first check of the correct operation of the door lock is. In this step the transmission of a first signal $P_1(p)$ to the control voltage is provided for, which in the embodiment is a very short quadratic signal, so as to substantially approximate a positive pulse, and a second signal $P_2(p)$ to the control voltage, which in the embodiment is also a quadratic, negative, or polarizing signal, opposite to the first signal $P_1(p)$, having a suitable duration.

This signals or pulses $P_1(p)$ and $P_2(p)$ cycle is transmitted by the central control unit U at least once to check the correct operation of the door-lock before enabling the locking command of the door-lock and it is possibly repeated continuously, before the door is locked, both with the door open and the door closed. This pulse cycle, as explained in greater detail below, allows to define the status of the door-lock, i.e. the correct operation of the same before executing the locking of the same.

Subsequently, in step (ii) there is the transmission of a locking signal SB, for locking the door, following a successful control of the faults absence in the door-lock. In this step the central control unit U sends a quadratic waveform signal to the supply voltage to the door-lock device 100 and with a duration such as to allow the activation of the actuator.

In step (iii) the locked door is detected, again by continuously transmitting cycles of signals $P_1(p)$ and $P_2(p)$ transmitted by the central control unit U.

In particular, in step (iii) there is at the beginning a first sub-step (at least a pair of pulses $P_1(p)$ and $P_2(p)$) for checking the correct operation of the door-lock device 100, before of the actual start-up of the household appliance as better described below.

As said, these pulse cycles are transmitted continuously until the machine continues in the operating cycle, to check that the door-lock device 100 is not subject to malfunctions throughout the operating cycle.

In step (iv) the door is unlocked, by means of an unlocking signal SSB, usually equal and opposite in polarity to the locking signal SB.

The truth table shown in Table 1, which is in fact a reference table, shows the impedance across said first 110 and said second 120 terminal, as measured by the central control unit U following the transmission of the signals or control pulses $P_1(p)$ and $P_2(p)$, so as to detect the state of the door-lock device 100, in different operating steps and its correct operation. In other words, this table summarizes the states of the door-lock device 100 as defined by reading the impedance at the ends of the door-lock device 100 by the central control unit U.

It is emphasized that this truth table takes into account the last two columns of two types of anomalous operation (which are the most relevant), but it can be enriched with as many columns and corresponding values as there are failure modes of the electrical circuit of the door-lock device 100 and, in this specific case, of the Hall sensor present therein.

The analysis method of the correct operation of the door-lock device 100 by reading the impedance on pulses to the control voltage, with inverted polarities, is completely generalizable.

TABLE 1

| Door state | Normal operation | Anomalous operation - break of the Hall sensor in open circuit | Anomalous operation - break of the Hall sensor in short circuit |
|---|---|---|---|
| Door open | $P_1(p) \rightarrow Z = \infty$<br>$P_2(p) \rightarrow Z = \infty$ | $P_1(p) \rightarrow Z = \infty$<br>$P_2(p) \rightarrow Z = \infty$ | $P_1(p) \rightarrow Z = \infty$<br>$P_2(p) \rightarrow Z = \infty$ |
| Door open unlocked | $P_1(p) \rightarrow Z = Z_{141} + Z_{142}$<br>$P_2(p) \rightarrow Z = Z_{141} + Z_{142}$ | $P_1(p) \rightarrow Z = Z_{141} + Z_{142-}$<br>$P_2(p) \rightarrow Z = Z_{141} + Z_{142}$<br>Anomaly undetectable as equal to the normal operation | $P_1(p) \rightarrow Z = (Z_{141} + Z_{142})//R_{160}$<br>$P_2(p) \rightarrow Z = (Z_{141} + Z_{142})//R_{160}$<br>Break of the door lock device |
| Door locked | $P_1(p) \rightarrow Z = (Z_{141} + Z_{142})//R_{160}$<br>$P_2(p) \rightarrow Z = Z_{141} + Z_{142}$ | $P_1(p) \rightarrow Z = Z_{141} + Z_{142}$<br>$P_2(p) \rightarrow Z = Z_{141} + Z_{142}$<br>Break of the door lock device | $P_1(p) \rightarrow Z = (Z_{141} + Z_{142})//R_{160}$<br>$P_2(p) \rightarrow Z = (Z_{141} + Z_{142})//R_{160}$<br>Break of the door lock device |

In general, the following nomenclature is indicated in the table: "+" impedances in series; "//" impedances in parallel.

Thus the symbolism $Z=(Z_{141}+Z_{142})//R_{160}$ indicates an overall impedance, which is the result of the parallel with the resistor 160 of the series of impedances 141 and 142.

As can be observed, in case of normal operation, when the switch 130 is open, and therefore the door is open, the impedance Z between said first 110 and said second 120 terminal is substantially infinite.

When the door is closed (but not locked), the closing switch 130 is closed, the impedance Z is equal to $Z=Z_{141}+$ $Z_{142}$, following the pulse $P_1(p)$, and $Z=Z_{141}+Z_{142}$ for the pulse $P_2(p)$ considering the impedances in absolute value or not considering the sign due to the pulse polarity change.

Finally, when the door is locked, as a result of the locking signal SB (i.e. in step (iii)), having an appropriate duration suitable to allow driving said actuating assembly 170 by means of said first 141 and second 142 coils, due to the pulse $P_1(p)$ there is an impedance $Z=(Z_{141}+Z_{142})//R_{160}$, and due to the pulse $P_2(p)$ one has $Z=Z_{141}+Z_{142}$.

These specific detections and their sequentiality as reported in Table 1, allow to determine the state of the door-lock device 100 or if it is in the condition of an open, closed unlocked and closed locked door.

In fact, the impedance values read following the sending of the pulse pair $P_1(p)$ and $P_2(p)$ is univocally determined as a function of the state. But as can be seen from the truth table, it is also possible with this system to determine the type of failure that the door-lock device 100 can assume and therefore set the household appliance in safe conditions after detecting the fault of the door-lock device 100 and its cause.

The anomalous impedance values between the terminals 110 and 120 are shown in the last two columns on the right, in which the Hall sensor 151 malfunctions, respectively, for open circuit and for short circuit.

In case of Hall sensor 151 breakage in an open circuit (i.e. with the resistor 160 which is never put into electrical communication with the rest of the circuit), regardless of the actual state of the door (locked or unlocked), an impedance will always be read, as a consequence of both the pulses $P_1(p)$ and $P_2(p)$, equal to $Z=(Z_{141}+Z_{142})$.

In case of the Hall sensor 151 breakage with the door not locked, this break cannot be detected, since in this case the impedance value is equal to the normal condition of an unlocked door.

However, after locking the door, in the first checking cycle by the pair of pulses $P_1(p)$ and $P_2(p)$, the same pair of impedances will be read, corresponding to the two pulses still equal to $Z=(Z_{141}+Z_{142})$: following this reading it is possible to identify the anomaly of the door-lock.

This reading after the door-lock lock signal has been sent is necessary before the machine is started following the locking of the door-lock (under step (iii)). Following this check and in case of a fault, the machine cycle can be safely started.

In case of breakage of the Hall sensor 151 in short circuit (i.e. with the resistor 160 always in electrical communication with the rest of the circuit), regardless of the actual state of the door (locked or unlocked), an impedance will always be read, as a result of both pulses $P_1(p)$ and $P_2(p)$, equal to $Z=(Z_{141}+Z_{142})//R_{160}$.

This condition does not match with any of the normal operating conditions, so that, as soon as this situation is detected, it can define an anomaly of the door-lock, which can be defined to set the machine in safe condition.

As mentioned, even after the machine has detected the closure and the locking of the door (step (iii)), and the central control unit U has activated an operating cycle, for example, in a household appliance such as a washing machine, a washing cycle, the control system S provides the continuous transmission of pairs of pulses with different polarity $P_1(p)-P_2(p)$ to check for possible malfunctions of the door-lock device 100 even during the operating cycles.

Obviously, these pulses $P_1(p)$ and $P_2(p)$ must have a voltage such as not to activate the actuator 140, so as not to risk to unlock the door during an operating cycle.

Generally, a possible time interval ΔT between a pair of pulses $P_1(p)$ and $P_2(p)$ and the following one is 30 seconds.

However, different time intervals ΔT can obviously be provided based on the level of control of the household appliance to be made.

Figure 3:
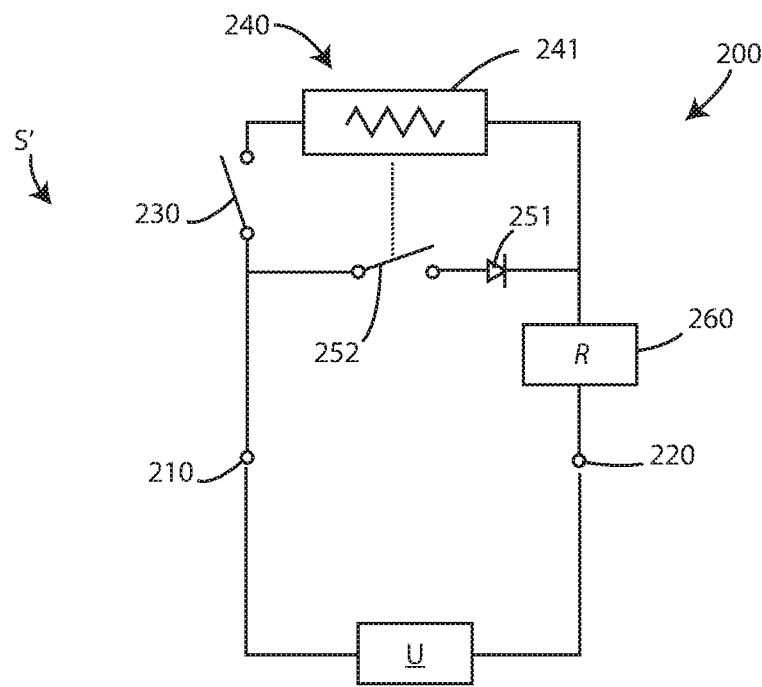
FIG. 3 shows the electrical diagram of a second embodiment of a control system of a door-lock device that carries out the controlling method according to the present invention.

Referring now to FIG. 3, a second embodiment of a control system S' can be seen, having in particular a door-lock device 200, which comprises an actuator 240, possibly made of a coil 241, a branch parallel to said actuator 240, comprising a switch 252, controlled by said actuator 240, and a diode 251. Finally, a resistor 260 is provided, arranged in series both with said coil 241, and with said diode 251.

The operation of the control system S' and of the relative door-lock device 200 described above is as follows.

When the door is open, the controlling switch 230 and said switch 252 are open.

When the door is closed, the controlling switch 230 is in its turn closed, while the switch 252 remains open.

When it is necessary to lock the door, the central control unit U powers the coil 141, which closes the switch 252.

In this case, a portion of the supply current I flows through the diode 251, so that the impedance of the door-lock device 200 undergoes a change, allowing said central control unit U to detect that the door is locked.

The control method according to the present invention is applied in a similar way to the door-lock device 200.

In particular, the central control unit U is capable of detecting with the method described above both the status of the door-lock in normal operation and a possible fault of the door-lock device 200 by means of the following truth table, shown in the following Table 2, which in fact is a reference table.

TABLE 2

| Door state | Normal operation | Anomalous operation - break of the Hall sensor in open circuit | Anomalous operation - break of the Hall sensor in short circuit |
|---|---|---|---|
| Door open | $P_1(p) \to Z = \infty$<br>$P_2(p) \to Z = \infty$ | $P_1(p) \to Z = \infty$<br>$P_2(p) \to Z = \infty$ | $P_1(p) \to Z = \infty$<br>$P_2(p) \to Z = \infty$ |
| Door closed unlocked | $P_1(p) \to Z = Z_{241} + R_{260}$<br>$P_2(p) \to Z = Z_{241} + R_{260}$ | $P_1(p) \to Z = Z_{141} + R_{260}$<br>$P_2(p) \to Z = Z_{141} + R_{260}$ | $P_1(p) \to Z = Z_{241} + R_{260}$<br>$P_2(p) \to Z = Z_{241} + R_{260}$ |
| Door locked | $P_1(p) \to Z = (Z_{241}//Z_{251}) + R_{260}$<br>$P_2(p) \to Z = Z_{241} + R_{260}$ | $P_1(p) \to Z = Z_{141} + R_{260}$<br>$P_2(p) \to Z = Z_{141} + R_{260}$ | $P_1(p) \to Z = R_{260}$<br>$P_2(p) \to Z = R_{260}$ |

As can be seen, according to Table 2, in accordance to the value of the impedance detected by the central control unit U, it is possible to easily detect if the diode is not correctly operating.

Furthermore, other impedance measures or responses can be stored in the central control unit U, so that the latter can detect failures of other electronic elements with greater specificity.

Also in this case, the control system S' provides for the transmission of couples of control pulses time interval $P_1(p)$ and $P_2(p)$ at appropriate time intervals ΔT also following the activation of the operating cycle of the household appliance, on which the door-lock device 200 is installed.

An advantage of the present invention is that the fault detection method of a door-lock device according to the invention can be easily memorized or installed in a central unit for controlling a household appliance, without particular structural modifications.

The present invention has been described for illustrative but not limitative purposes, according to its preferred embodiments, but it is to be understood that modifications and/or changes can be introduced by those skilled in the art without departing from the relevant scope as defined in the enclosed claims.

The invention claimed is:

1. A method for detecting the status and failure of a door-lock device of a household appliance door, wherein said door-lock device is of the type having electrical or electronic components and a first and a second terminal for power supplying, wherein said door-lock device has different door-lock states, wherein said method comprises the following steps:
   A. applying a first control signal having a first polarization;
   B. detecting the impedance to the ends of said first and second terminals due to the application of said first control signal;
   C. applying a second control signal, having opposite polarization to said first control signal;
   D. detecting the impedance to the ends of said first and second terminals following the application of said second control signal;
   E. providing a reference table, wherein the impedances at the ends of said first and second terminal of said door-lock device in each of said door-lock device states are provided; and
   F. comparing the impedance values measured at the ends of said first and second terminals with those of said comparative table, so as to detect the states of the door-lock device and therefore any faults of said door-lock device, according to the detected impedance values.

2. The method according to claim 1, wherein the door-lock states comprise:
   opened door of said household appliance;
   unlocked closed door of said household appliance; and
   locked door of said household appliance;
   wherein each of said states can undergo as many variations as there are ways of failure of the door-lock device.

3. The method according to claim 1, wherein said steps A-F are cyclically repeated.

4. The method according claim 1, wherein
   said first control signal has a quadratic waveform, and/or
   said second control signal has a quadratic waveform.

5. The method according to claim 1, wherein said door-lock device is supplied by a supply voltage and said control signals have a control voltage lower than said supply voltage.

6. The method according to claim 1, wherein each pair of said first and second control signals are transmitted at predefined time intervals.

7. The method according to claim 6, wherein said predefined time intervals are equal to 30 seconds.

8. A control system comprising
   a door-lock device and
   a central control unit, connected to said first and second terminals of said door-lock device, wherein said central control unit is configured to carry out the steps of the method according to claim 1.

9. The control system according to claim 8, wherein said door-lock device comprises
   a first and a second electrical terminal, connectable to said central control unit,
   a closing switch series arranged to said first or second terminal,
   at least one coil connected to said first and said second terminal, and
   a Hall sensor connected to said first and said second terminal, arranged in parallel with said at least one coil.

10. The system according to claim 9, wherein said door-lock device comprises a first and a second coil, series connected.

11. The system according to claim 8, wherein said door-lock device comprises
    a first and a second electrical terminal, connectable to said central control unit,
    a closing switch arranged in series with said first or second terminal,
    a coil connected to said first and said second terminal,
    a switch controlled by said coil and
    a diode, series connected to said switch, wherein said diode and said switch are parallel connected to said coil, and
    a resistor series connected to said coil and to the branch, wherein said switch and said diode are series connected.

12. A program for the central control unit comprising instructions, which, when said program is executed by a central control unit, cause said central control unit to carry out the steps of said method according to claim 1.

13. A storage medium readable from a central control unit, comprising instructions, which, when executed by a central control unit, cause the central control unit to carry out the steps of said method according to claim 1.

* * * * *